(12) United States Patent
Tuller

(10) Patent No.: US 12,391,130 B1
(45) Date of Patent: Aug. 19, 2025

(54) STATIC FRICTION TO DYNAMIC FRICTION SPIN UP MODELING AND CONTROLS FOR VEHICLE ELECTRIC MOTOR IN NEUTRAL

(71) Applicant: FCA US LLC, Auburn Hills, MI (US)

(72) Inventor: Zachary L Tuller, Grand Rapids, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/640,763

(22) Filed: Apr. 19, 2024

(51) Int. Cl.
*B60W 10/08* (2006.01)
*B60L 15/20* (2006.01)
*B60W 10/02* (2006.01)
*B60W 10/10* (2012.01)

(52) U.S. Cl.
CPC ......... *B60L 15/2054* (2013.01); *B60W 10/02* (2013.01); *B60W 10/08* (2013.01); *B60W 10/10* (2013.01); *B60L 2240/421* (2013.01); *B60L 2240/423* (2013.01); *B60L 2240/507* (2013.01); *B60L 2260/28* (2013.01); *B60W 2510/081* (2013.01); *B60W 2710/021* (2013.01); *B60W 2710/081* (2013.01); *B60W 2710/083* (2013.01)

(58) Field of Classification Search
CPC ........... B60L 15/2054; B60L 2240/421; B60L 2240/423; B60L 2240/507; B60L 2260/28; B60W 10/08; B60W 10/02; B60W 2030/203; B60W 30/19; B60W 2510/083; B60W 2510/081; B60W 2520/10; B60W 2520/28; B60W 2510/104; B60W 2710/021; B60W 2710/081; B60W 2710/083
USPC ...................................... 477/5, 8, 14; 701/22
See application file for complete search history.

(56) References Cited

U.S. PATENT DOCUMENTS

| 8,888,636 B2 | 11/2014 | Ikegami et al. |
| 9,193,263 B2 | 11/2015 | Ekonen et al. |
| 9,725,163 B2 | 8/2017 | Edelson et al. |

(Continued)

FOREIGN PATENT DOCUMENTS

| FR | 3081391 A1 | 11/2019 |
| WO | 2021219292 A1 | 11/2021 |

OTHER PUBLICATIONS

English translation of WO2021219292A1; http://translationportal.epo.org; Apr. 17, 2025 (Year: 2025).*

*Primary Examiner* — Roger L Pang
(74) *Attorney, Agent, or Firm* — Jeremy J. Klobucar

(57) ABSTRACT

A modeling and control technique for an electric motor of an electrified vehicle includes preparing for reconnection of an electric motor to a driveline, which were temporarily disconnected by a disconnect system therebetween, by commanding the electric motor to generate an open-loop torque in an attempt to overcome a static friction of the electric motor and to begin spinning the electric motor, receiving a set of operating parameters of the electrified vehicle including (i) a speed of the electrified vehicle and (ii) a speed of the electric motor, and in response to detecting that a speed/position of the electric motor increases to the value greater than zero, commanding a feed-forward target speed for open-loop control of the electric motor, wherein the feed-forward target speed ignores static friction dynamics and is offset by a first offset to compensate for delay in actuating the electric motor.

20 Claims, 3 Drawing Sheets

(56) References Cited

U.S. PATENT DOCUMENTS

| | | | | |
|---|---|---|---|---|
| 2012/0309587 A1* | 12/2012 | Nozaki | ................. | B60W 10/02 |
| | | | | 180/65.265 |
| 2013/0297109 A1* | 11/2013 | Nefcy | ....................... | B60L 7/12 |
| | | | | 701/22 |
| 2014/0229044 A1* | 8/2014 | Dai | ....................... | B60W 10/08 |
| | | | | 903/902 |

* cited by examiner

STATIC FRICTION TO DYNAMIC FRICTION SPIN UP MODELING AND CONTROLS FOR VEHICLE ELECTRIC MOTOR IN NEUTRAL

FIELD

The present application generally relates to electrified vehicles and, more particularly, to techniques for static friction to dynamic friction spin up modeling and controls for a vehicle electric motor in neutral.

BACKGROUND

An electrified vehicle includes at least one electric motor, which could be a traction motor configured to provide propulsive torque to propel the electrified vehicle. Some electrified powertrains are capable of temporarily disconnecting an electric motor from the road (also referred to herein as "neutral"). This allows for the electric motor speed to be zero while the electrified vehicle is moving, thereby reducing or eliminating system losses. Reconnecting the electric motor to the road while the electrified vehicle is moving involves "spin up" control of the electric motor to synchronize the electric motor and electrified vehicle speeds. This is a difficult/complex process that needs to be performed quickly and precisely. Conventional solutions are inadequate because they only attempt to minimize communication delays or have entirely different system dynamics (e.g., the electric motor is connected to an engine). Accordingly, while such conventional electric motor modeling and control systems and methods do work for their intended purpose, there exists an opportunity for improvement in the relevant art.

SUMMARY

According to one example aspect of the invention, a modeling and control system for an electric motor of an electrified vehicle is presented. In one exemplary implementation, the system comprises a set of sensors configured to measure a set of operating parameters of the electrified vehicle, the set of operating parameters including (i) a speed of the electrified vehicle and (ii) a speed of the electric motor, wherein the electric motor is selectively connected to and disconnected from a driveline of the electrified vehicle by a disconnect system and a control system configured to command the disconnect system to disconnect the electric motor from the driveline and prepare for reconnection of the electric motor to the driveline by commanding the electric motor to generate an open-loop torque in an attempt to overcome a static friction of the electric motor and to begin spinning the electric motor and, in response to detecting that a speed/position of the electric motor increases to the value greater than zero, commanding a feed-forward target speed for open-loop control of the electric motor, wherein the feed-forward target speed ignores static friction dynamics and is offset by a first offset to compensate for delay in actuating the electric motor.

In some implementations, the first offset is obtained by integrating products of commanded torques and inertias of the electric motor. In some implementations, the control system is further configured to command a closed-loop target speed for closed-loop control of the electric motor, wherein the closed-loop target speed is set to the feed-forward target speed at a previous time. In some implementations, the previous time corresponds to at least one of a communication delay, an actuation delay, and a processing delay. In some implementations, the control system is further configured to command the disconnect system to reconnect the electric motor to the driveline when their respective speeds are within a threshold amount from each other. In some implementations, the electric motor is connectable to a front axle of the driveline, and wherein the electrified vehicle further comprises another electric motor connected to a rear axle of the driveline. In some implementations, the disconnect system is a splined disconnect clutch. In some implementations, the disconnect system is a front axle disconnect (FAD). In some implementations, the disconnect system is one or more wheel end disconnects (WEDs). In some implementations, the disconnect system is an automatic transmission.

According to another example aspect of the invention, a modeling and control method for an electric motor of an electrified vehicle is presented. In one exemplary implementation, the method comprises commanding, by a control system, a disconnect system to disconnect an electric motor of the electrified vehicle from a driveline of the electrified vehicle and preparing, by the control system, for reconnection of the electric motor to the driveline by commanding the electric motor to generate an open-loop torque in an attempt to overcome a static friction of the electric motor and to begin spinning the electric motor, receiving, by the control system and from a set of sensors of the electrified vehicle, a set of operating parameters of the electrified vehicle including (i) a speed of the electrified vehicle and (ii) a speed of the electric motor, and in response to detecting that a speed/position of the electric motor increases to the value greater than zero, commanding, by the control system, a feed-forward target speed for open-loop control of the electric motor, wherein the feed-forward target speed ignores static friction dynamics and is offset by a first offset to compensate for delay in actuating the electric motor.

In some implementations, the first offset is obtained by integrating products of commanded torques and inertias of the electric motor. In some implementations, the method further comprises commanding, by the control system, a closed-loop target speed for closed-loop control of the electric motor, wherein the closed-loop target speed is set to the feed-forward target speed at a previous time. In some implementations, the previous time corresponds to at least one of a communication delay, an actuation delay, and a processing delay. In some implementations, the method further comprises commanding, by the control system, the disconnect system to reconnect the electric motor to the driveline when their respective speeds are within a threshold amount from each other. In some implementations, the electric motor is connectable to a front axle of the driveline, and wherein the electrified vehicle further comprises another electric motor connected to a rear axle of the driveline. In some implementations, the disconnect system is a splined disconnect clutch. In some implementations, the disconnect system is an FAD. In some implementations, the disconnect system is one or more WEDs. In some implementations, the disconnect system is an automatic transmission.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do

DESCRIPTION

As previously discussed, reconnecting an electric motor of an electrified powertrain that is temporarily disconnected (also referred to herein as "neutral") back to the road involves "spin up" control of the electric motor to synchronize the motor and vehicle speeds. This is a difficult/complex process that involves a plurality of different electronic control units (ECUs) in communication on a controller area network (CAN) and that needs to be performed quickly and precisely. In particular, there are lag times from commanding motor torque to observing motor speed feedback from a sensor, and parameters such as initial motor spin-up static friction losses are difficult to model. Conventional solutions are inadequate because they only attempt to minimize communication delays or have entirely different system dynamics (e.g., the electric motor is connected to an engine). Accordingly, improved spin up modeling and control techniques for an electric motor in neutral are presented herein. Potential benefits of these techniques include faster and/or smoother electric motor spin up and/or reconnection to the road and an improved driver experience.

These techniques begin when the electric motor is temporarily disconnected from the road (i.e., in neutral). When a torque request for the electrified powertrain exceeds a threshold that indicates that the electric motor is needed to satisfy the torque request, the electric motor must be reconnected. Before the electric motor can be reconnected, however, it must first be spun-up and its speed synchronized with the electrified vehicle's speed. First, a feed-forward (open-loop) torque is commanded with a known communication (CAN) delay. Once a change in motor speed/position is observed, closed-loop feedback control of motor speed is enabled, where static friction modeling can be ignored because the motor is in a dynamic friction regime. The closed-loop speed target is thus recalculated as a sum of torque commands send in the known communication (CAN) delay and the observed motor speed. The feed-forward (open-loop) control then begins dynamic friction speed profiling at this recalculated speed target. In the closed-loop control, the closed-loop speed target is calculated based on the open-loop system's speed target and the torque commands sent to the motor while awaiting the observed speed/position change, factoring in communication (CAN) delay and any other minor corrections.

Figure 1:
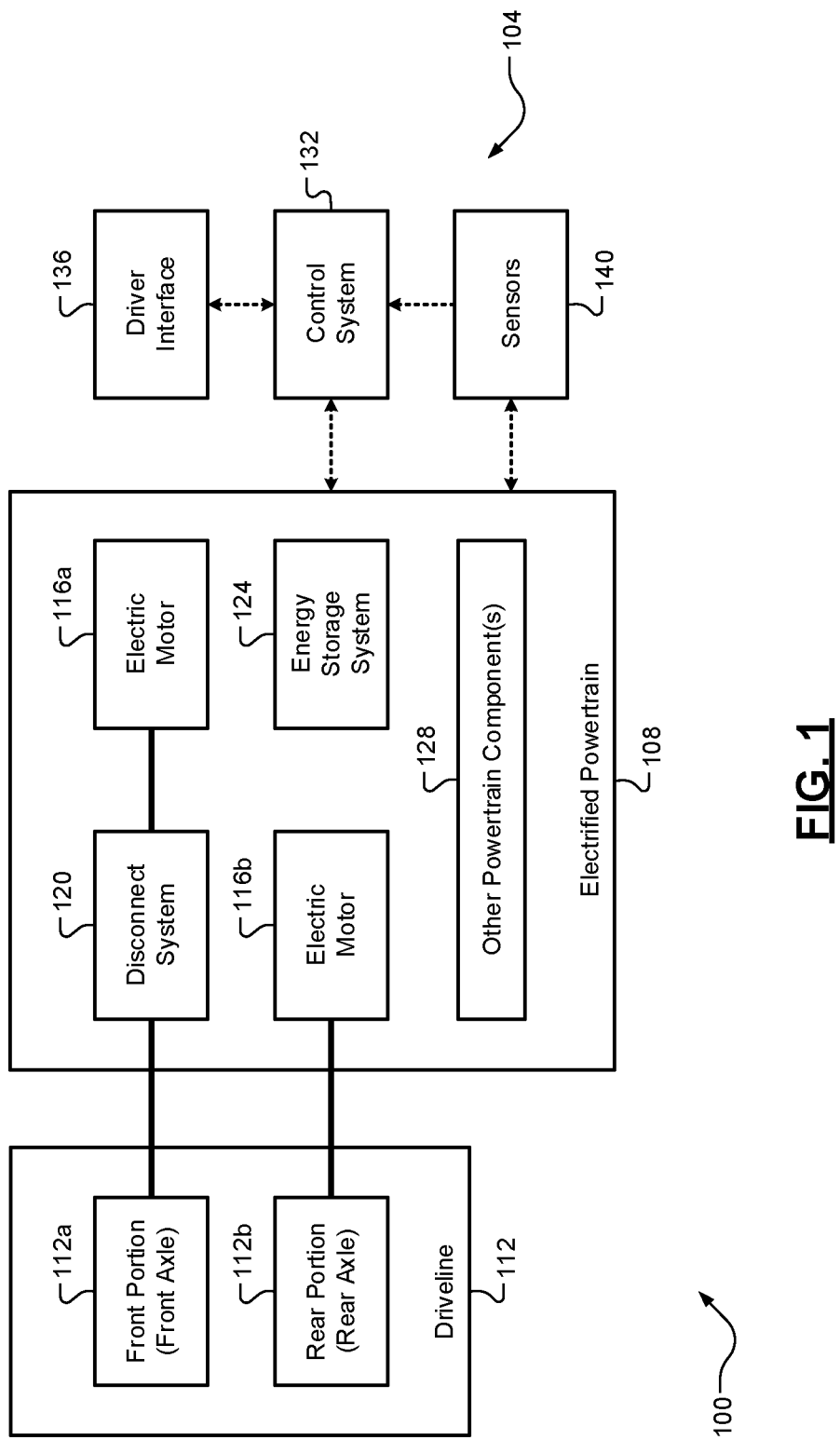
FIG. 1 is a functional block diagram of an electrified vehicle having an example electric motor modeling and control system according to the principles of the present application.

Referring now to FIG. 1, a functional block diagram of an electrified vehicle 100 having an example electric motor modeling and control system 104 according to the principles of the present application is illustrated. The electrified vehicle 100 (also "vehicle 100" herein) includes an electrified powertrain 108 that is configured to generate and transfer propulsive torque to a driveline system 112 for vehicle propulsion. As shown, the electrified powertrain 108 includes a first electric motor 116a that is selectively connected to a first portion 112a of the driveline system 112 (e.g., a front axle) via a disconnect system 120 and a second electric motor 116b that is connected to a second portion 112b of the driveline system 112 (e.g., a rear axle). The electrified powertrain 108 includes an energy storage system 124 that provides electrical energy (current) to power the electric motors 116a, 116b (collectively, "electric motors 116"). The energy storage system 124 could include a high voltage battery pack or system, a fuel cell system, or some combination thereof. The electrified powertrain 108 could also include one or more other powertrain components 128, such as, but not limited to, a multi-speed automatic transmission and/or an internal combustion engine.

The disconnect system 120 could be any suitable device or system that is configured to selectively connect the electric motor 116a to the first portion 112a of the driveline system 112 and to selectively disconnect the electric motor 116a from the first portion 112a of the driveline system 112. Non-limiting examples of the disconnect system 120 include a splined disconnect clutch, a conventional automatic transmission, a front axle disconnect (FAD), and one or more wheel end disconnects (WEDs). When disconnected from the first portion 112a of the driveline system 112, the electric motor 116a will be in neutral and thus will be able to be fully disabled (e.g., at zero speed) for a period of time during which friction losses are reduced and, in turn, vehicle efficiency is increased. A controller or control system 132 controls operation of the electrified vehicle 100 and, more particularly, controls the electrified powertrain 108 to generate an amount of drive torque in satisfaction of a driver torque request via a driver interface 136 (e.g., an accelerator pedal). The control system 132 also receives measurements from a set of sensors 140, including, but not limited to, operating parameters of the electrified vehicle 100 such as a speed of the electrified vehicle 100 ("vehicle speed") and a speed of the electric motor 116a ("motor speed").

Figure 2:
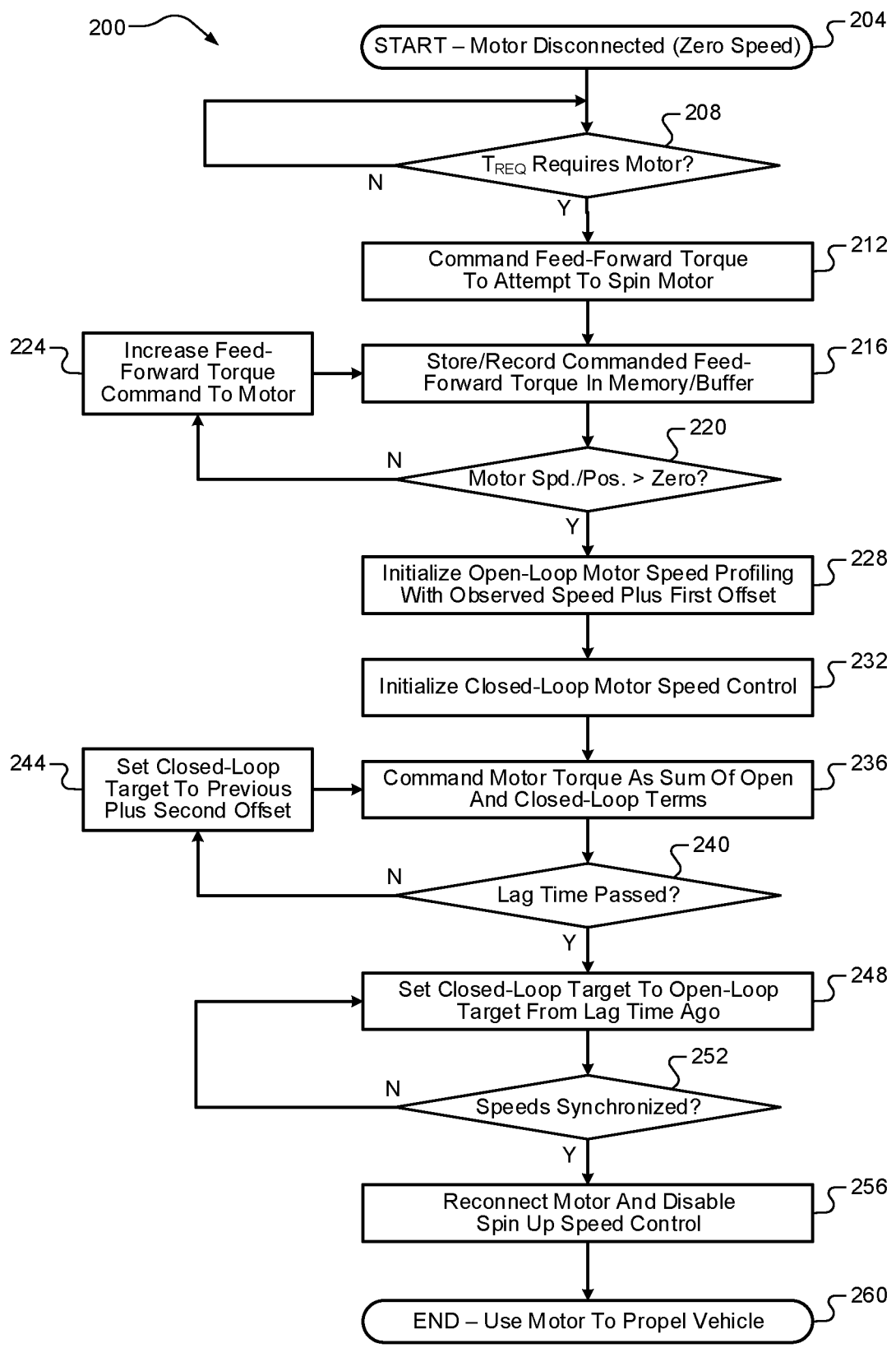
FIG. 2 is a flow diagram of an example method of modeling and controlling an electric motor of an electrified vehicle according to the principles of the present application.
Figure 3A:
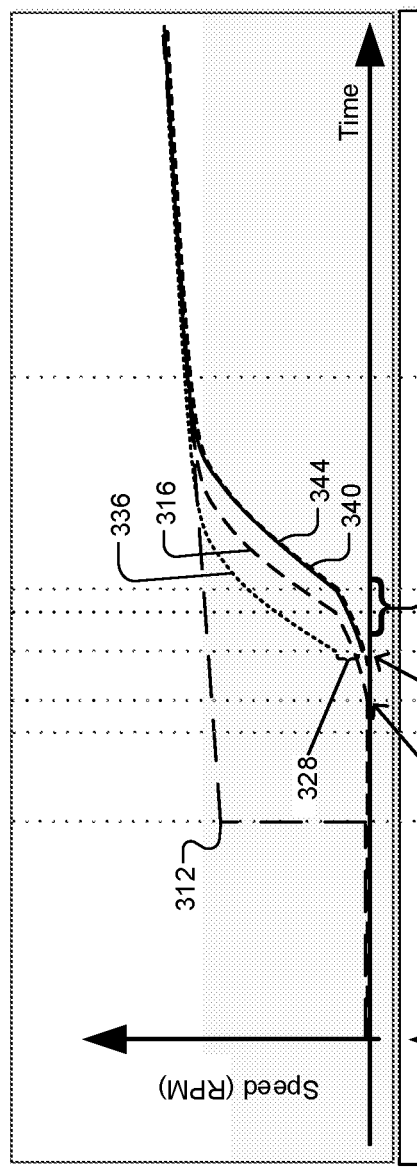
FIGS. 3A-3B are example torque and speed plots illustrating the example modeling and control of an electric motor of an electrified vehicle according to the principles of the present application.
Figure 3B:
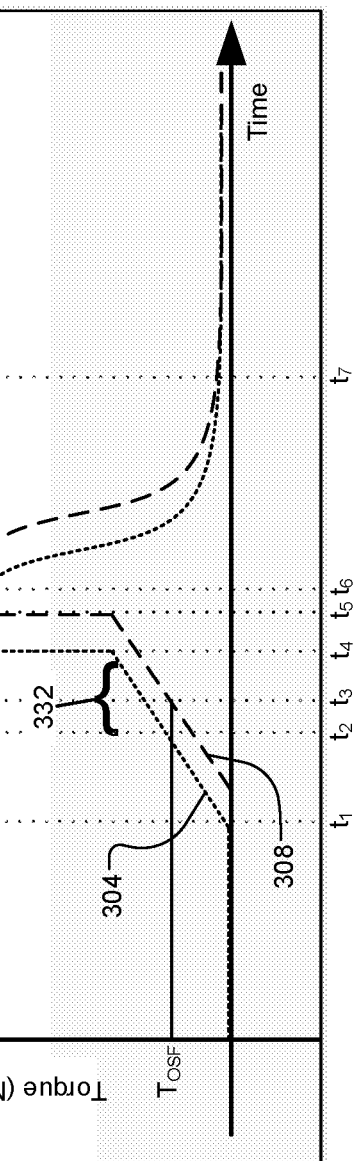

Referring now to FIG. 2, a flow diagram of an example method 200 of modeling and controlling an electric motor of an electrified vehicle according to the principles of the present application is illustrated. FIGS. 3A-3B, which depict example torque and speed plots illustrating the example modeling and control of an electrified vehicle electric motor (e.g., electric motor 116a). While the following description specifically references the electrified vehicle 100 and its components, it will be appreciated that the method 200 could be applicable to any suitably configured electrified vehicle (e.g., any electrified vehicle having an electric motor that is temporarily disconnected from the road). The method 200 begins at 204 where the electric motor 116a is disconnected (by disconnect system 120) from the front portion 112a of the driveline system 112. This could have been previously performed in response to a driver torque request ($T_{REQ}$) for the electrified powertrain falling below a threshold that required the electric motor 116a in order to satisfy. At 208, the control system 132 determines the electric motor 116a is required to be connected through the disconnect system 120 to the first portion 112a of the driveline system 112. This could be because the driver torque request ($T_{REQ}$) has increased to a level (e.g., greater than the threshold) that now requires the electric motor 116a in order to satisfy, because the driver has requested four wheel drive, or other factors. When false, the method 200 ends or returns to 208. When true, the method 200 proceeds to 212. At 212, the control system 132 commands a feed-forward (open-loop) torque command to attempt to spin the electric motor 116a.

In FIG. 3B, the commanded torque 304 begins increasing at time $t_1$ and the actual torque 308 begins increasing after small delay (e.g., due to actuator and CAN communication delay). This also causes an increase in the speed request 312 for the electric motor 116a, which can be seen in FIG. 3A. In order to cause the electric motor 116a to start spinning, a certain amount of torque must be commanded, which is shown and described as a torque to overcome static friction, or $T_{OSF}$. At 216, the control system 132, at each time step or interval after time t1, stores the commanded feed-forward (open-loop) torque in a memory or buffer (e.g., in control system 132). At 220, the control system 132 determines whether the observed speed/position of the electric motor 116a (e.g., from sensor(s) 140) is greater than zero, indicating that the electric motor 116a has begin moving/spinning. This can be seen in FIG. 3A where the actual speed 316 of the electric motor 116a increases to a value greater than zero at point 320, but an observed/sensed speed 340 of the electric motor 116a is not recognized until point 324. When false at 220, the method 200 proceeds to 224 where the feed-forward (open-loop) torque command is increased and the method 200 returns to 216. When true at 220, the method 200 proceeds to 228.

At 228, the control system 132 initializes open-loop motor speed profiling with the observed/sensed speed of the electric motor 116a plus a first offset 328. This first offset 328 is obtained from integrating a product of the commanded torques and inertias for the electric motor 116a during a previous period 332. This first offset 328 is utilized to compensate for the initial communication lag time from approximately time $t_2$ to time $t_4$. For example only, this lag time between commanding motor torque and observing a change in motor speed/position could be approximately 70 milliseconds (ms). Additionally, for example only, the entire illustrated period in FIGS. 3A-3B, from time $t_1$ to time $t_7$, could be approximately 500 ms. After applying the first offset 328, the open-loop motor speed profiling begins and is shown by curve 336. At 232, closed-loop speed control of the electric motor 116a is also initialized. This closed-loop control should not be needed if the open-loop speed profiling stays accurately on target, but the closed-loop control allows for minor correction if needed. The target speed for the closed-loop control is illustrated by curve 344 and, as mentioned, it is almost identical to the observed/sensed speed 340 of the electric motor 116a.

At 240, the control system 132 determines whether a communication and actuation lag time has passed. As previously mentioned, this lag time could be approximately 70 ms. When false, the method 200 proceeds to 244 where the closed-loop target speed is set to a previous value plus an offset each iteration and the method 200 returns to 236. The offset each iteration, also referred to as a "second offset," is obtained by summing products of commanded torque and motor inertia at every time step across a previous period 332 and creates the closed-loop speed target 344 in time period 348. When true at 240, the method 200 proceeds to 248. At 248, the control system 132 sets the closed-loop speed target 340 to the open-loop speed target 336 from a communication and actuation lag time ago (e.g., 70 ms earlier). At 252, the control system 132 determines whether the speeds of the electrified vehicle 100 (the front portion 112a of the driveline system 112) and the electric motor 116a are synchronized (e.g., within a threshold amount from each other). When false, the method 200 returns to 248. When true, the method 200 proceeds to 256 where the control system 132 controls the disconnect system 120 to reconnect the electric motor 116a to the first portion 112a of the driveline system 112 and the spin up control of the previous steps is disabled. The method 200 then ends at 260 where the electric motor 116a is utilized for propulsion of the electrified vehicle 100, such as until it is subsequently no longer needed for propulsion and can once again be disconnected from the first portion 112a of the driveline system 112 by the disconnect system 120 to save energy.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A modeling and control system for an electric motor of an electrified vehicle, the system comprising:
   a set of sensors configured to measure a set of operating parameters of the electrified vehicle, the set of operating parameters including (i) a speed of the electrified vehicle and (ii) a speed of the electric motor, wherein the electric motor is selectively connected to and disconnected from a driveline of the electrified vehicle by a disconnect system; and
   a control system configured to command the disconnect system to disconnect the electric motor from the driveline and prepare for reconnection of the electric motor to the driveline by:
      commanding the electric motor to generate an open-loop torque in an attempt to overcome a static friction of the electric motor and to begin spinning the electric motor; and
      in response to detecting that a speed/position of the electric motor increases to the value greater than zero, commanding a feed-forward target speed for open-loop control of the electric motor, wherein the feed-forward target speed ignores static friction dynamics and is offset by a first offset to compensate for delay in actuating the electric motor.

2. The system of claim 1, wherein the first offset is obtained by integrating products of commanded torques and inertias of the electric motor.

3. The system of claim 2, wherein the control system is further configured to command a closed-loop target speed for closed-loop control of the electric motor, wherein the closed-loop target speed is set to the feed-forward target speed at a previous time.

4. The system of claim 3, wherein the previous time corresponds to at least one of a communication delay, an actuation delay, and a processing delay.

5. The system of claim 1, wherein the control system is further configured to command the disconnect system to reconnect the electric motor to the driveline when their respective speeds are within a threshold amount from each other.

6. The system of claim 5, wherein the electric motor is connectable to a front axle of the driveline, and wherein the electrified vehicle further comprises another electric motor connected to a rear axle of the driveline.

7. The system of claim 1, wherein the disconnect system is a splined disconnect clutch.

8. The system of claim 1, wherein the disconnect system is a front axle disconnect (FAD).

9. The system of claim 1, wherein the disconnect system is one or more wheel end disconnects (WEDs).

10. The system of claim 1, wherein the disconnect system is an automatic transmission.

11. A modeling and control method for an electric motor of an electrified vehicle, the method comprising:
    commanding, by a control system, a disconnect system to disconnect an electric motor of the electrified vehicle from a driveline of the electrified vehicle; and
    preparing, by the control system, for reconnection of the electric motor to the driveline by:
        commanding the electric motor to generate an open-loop torque in an attempt to overcome a static friction of the electric motor and to begin spinning the electric motor;
        receiving, by the control system and from a set of sensors of the electrified vehicle, a set of operating parameters of the electrified vehicle including (i) a speed of the electrified vehicle and (ii) a speed of the electric motor; and
        in response to detecting that a speed/position of the electric motor increases to the value greater than zero, commanding, by the control system, a feed-forward target speed for open-loop control of the electric motor, wherein the feed-forward target speed ignores static friction dynamics and is offset by a first offset to compensate for delay in actuating the electric motor.

12. The method of claim 11, wherein the first offset is obtained by integrating products of commanded torques and inertias of the electric motor.

13. The method of claim 12, further comprising commanding, by the control system, a closed-loop target speed for closed-loop control of the electric motor, wherein the closed-loop target speed is set to the feed-forward target speed at a previous time.

14. The method of claim 13, wherein the previous time corresponds to at least one of a communication delay, an actuation delay, and a processing delay.

15. The method of claim 11, further comprising commanding, by the control system, the disconnect system to reconnect the electric motor to the driveline when their respective speeds are within a threshold amount from each other.

16. The method of claim 15, wherein the electric motor is connectable to a front axle of the driveline, and wherein the electrified vehicle further comprises another electric motor connected to a rear axle of the driveline.

17. The method of claim 11, wherein the disconnect system is a splined disconnect clutch.

18. The method of claim 11, wherein the disconnect system is a front axle disconnect (FAD).

19. The method of claim 11, wherein the disconnect system is one or more wheel end disconnects (WEDs).

20. The method of claim 11, wherein the disconnect system is an automatic transmission.

* * * * *